INVENTORS
WALTER MEYER
ZOLTAN BEDÒ

ATTORNEYS

United States Patent Office 3,432,726
Patented Mar. 11, 1969

3,432,726
OVERLOAD AND SHORT-CIRCUIT PROTECTION FOR A D.C. VOLTAGE REGULATOR
Walter Meyer and Zoltan Bedo, Zurich, Switzerland, assignors to Albiswerk Zurich A.G., Zurich, Switzerland
Filed Dec. 21, 1966, Ser. No. 603,587
Claims priority, application Switzerland, Jan. 26, 1966, 1,067/66
U.S. Cl. 317—31
Int. Cl. G05f 3/08
10 Claims

ABSTRACT OF THE DISCLOSURE

A D.C. voltage regulator with a transistor and current sensing resistor in series between the input and output of the regulator. A normally non-conductive bistable switch is rendered conductive upon the occurrence of an overload, short circuit or high ripple to block the transistor and interrupt current to a load.

Background of the invention

It is known to provide regulated D.C. voltage power supplies which are supplied from commercial A.C. mains. These power supplies include rectifying means providing an unregulated D.C. output voltage, and suitable means are connected between the rectifying means and the load to control the current to the load, and thus the voltage across the load, in response to variations in the load voltage and in a manner such as to maintain the load voltage constant. Known devices of this type include one or more control transistors connected in series between the output of the rectifier device and the load, and these control transistors are controlled by one or more further transistors which operate responsive to the load voltage.

These transistor arrangements, which are thus connected between the output of the uncontrolled D.C. voltage source and the load circuit, work quite satisfactorily. However, difficulties appear in the case of overloads, due to excessively high current consumption or short circuits in the load. Up to the present, fuses, over load relays, and etc., have been used for protective purposes. However, in the case of fuses, it has been found that the control transistor or transistors are usually destroyed before the fuse "blows."

For effective protection, the protective arrangement should make it possible for the load current to exceed the nominal value of the current at the feed voltage source by a certain amount and over a certain short time duration, with the device being disconnected as rapidly as possible in case of a short circuit. If tantalum condensers are used in the load, even a high ripple factor, such as is formed, for example, when one phase of a three phase rectifier fails, is dangerous. A protective circuit should be able to respond in this case also to disconnect the supply from the load.

Summary of the invention

The present invention provides a regulated D.C. voltage power supply in which the D.C. currents circuit or path is interrupted, in the power supply, in the case of permanent overload, short circuit in the load, or high ripple factor. To effect this, a resistor is connected in series between a control transistor and a load terinal, and a bistable switching device is connected in parallel with the base-emitter circuit of the transistor and also the resistor. This bistable switch device has a control input connected by a voltage integrating circuit with the load terminal of the resistor, and also by a condenser with the other D.C. conductor. This voltage integrating circuit, which integrates the voltage across the resistor, is bridged with a series connection of a Zener diode and a semi-conductor valve element. In response to an overload, short circuit in the load, or high ripple factor, the normally non-conductive bistable switching means is triggered conductive to short the input or base-emitter circuit, of the control transistor, and thus to block this transistor.

Accordingly, an object of the present invention is to provide an improved regulated D.C. voltage power supply capable of interrupting the flow of direct current in the case of permanent overload, short circuit in the load, or high ripple factor.

Another object of the invention is to provide such a regulated D.C. voltage power supply which, before interrupting the D.C. current, will permit a small and determined increase in the D.C. current above a nominal value and for a relatively short predetermined time interval.

A further object of the invention is to provide a regulated D.C. voltage power supply having a rapid current interrupting action in the event of overload, short circuit in the load, or high ripple factor.

Still another object of the invention is to provide a regulated D.C. voltage power supply of the type mentioned above and which is simple in construction, and economical and efficient in operation.

Brief description of the drawing

For an understanding of the principles of the invention, reference is made to the following description of a typical embodiment thereof as illustrated in the accompanying drawings.

In the drawings.

Description of the preferred embodiment

Figure 1:
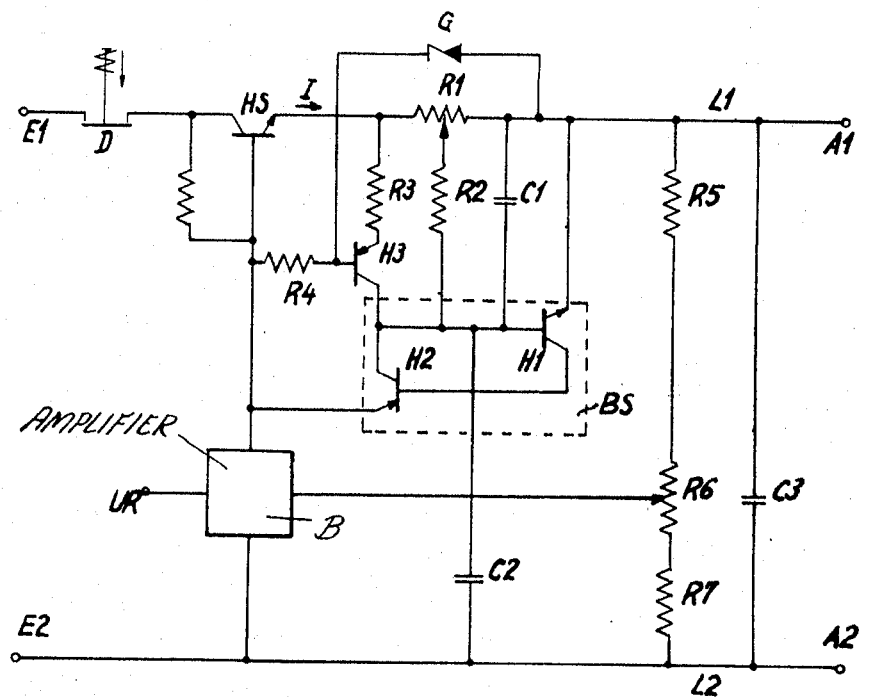
FIG. 1 is a schematic wiring diagram of one embodiment of regulated D.C voltage power supply in accordance with the invention.

Referring to FIG. 1, a regulated D.C. voltage power supply embodying the invention is illustrated as including input terminals E1 and E2 and output or load terminals A1 and A2. Input terminal E1 is connected with output terminal A1 by a positive voltage conductor L1, and input terminal E2 is connected with output terminal A2 by a negative voltage conductor L2. Input terminals E1 and E2 have applied thereacross an unregulated D.C. voltage derived from a suitable rectifier supplied from commercial A.C. mains, and the rectifier may be either a single phase rectifier or a three-phase rectifier A control transistor HS has its collector-emitter circuit connected in series in conductor or line L1 and serves to regulate the D.C. output voltage at terminals A1 and A2. Control of the regulating is effected by an amplifier B to which is supplied a reference voltage UR and the voltage across the output terminals A1 and A2. This output or load voltage between terminals A1 and A2 is tapped, for regulation, across an adjustable voltage divider including series connected resistors R5, R6 and R7, of which resistor R6 is designed as a potentiometer. A condenser C3, connected in parallel to the voltage divider, acts as a filter.

A potentiometer R1 is connected in line L1 between the emitter of NPN transistor HS and the load terminal A1. This line L1, which may be termed the positive D.C. conductor, has a direct current I flowing therethrough. A break switch D is provided between input terminal E1 and the collector of variable load transistor HS and, when operated, interrupts the connection of the collector of transistor HS to the input terminal E1.

A bistable switching means, switching step, or switching stage is connected in parallel with the base-emitter circuit of transistor HS, and is also connected to potentiometer R1. Thus, the adjustable tap of potentiometer R1 is connected through a resistor R2 to the input of bistable switch means BS. The input of bistable switch means BS has also connected thereto a condenser C1, the collector of a transistor H3, acting as a semi-conductor valve element, and a condenser C2. The other terminal of condenser C1 is connected to line L1, and the other terminal of condenser C2 is connected to line L2, which may be termed the negative D.C. conductor. The base of transistor H3, which is a PNP transistor, is connected, on the one hand, and through a resistor R4, with the line connecting amplifier B and the base variable load transistor HS. The base of transistor H3 is connected, on the other hand, to the cathode of a Zener diode G whose anode is connected with line L1. A current limiting resistor R3 connects the emitter of transistor H3 to the line L1.

In the embodiment of the invention illustrated in FIG. 1, bistable switch means BS is in the form of a known bistable circuit including two complementary transistors H1 and H2, of which transistor H1 is a NPN transistor and transistor H2 is a PNP transistor. The base of transistor H1 is connected with the collector of transistor H2, and also comprises the control input of bistable switch means BS. The base of transistor H2 is connected with the collector of transistor H1. The emitter of transistor H1 is connected with line L1, and the emitter of transistor H2 is connected with the line connecting amplifier B and variable load transistor HS.

The method of operation of the circuit arrangement shown in FIG. 1 will now be described, based on the assumption of the three disturbances to be supervised, namely excess current, short circuit, and high ripple factor. Normally, bistable switch means BS is non-conductive, and the DC. voltage between lines L1 and L2 is thus regulated in a known manner, by control transistor HS.

Upon the occurrence of excess current, the voltage drop across resistor R1 increases, and condenser C1 is charged across resistor R2. When the voltage on condenser C1 increases above the response voltage of transistor H1, the latter becomes conductive. Due to the mutual feedback between transistors H1 and H2, both transistors become conductive rapidly, and form a short circuit across the base-emitter circuit of transistor HS. The latter is thus made inoperative or blocked.

The charging time of the voltage-integrating member including resistor R2 and condenser C1 depends, as is known, on the time constant based on the respective values of these two elements. There can thus be selected any response characteristic corresponding, for example, to a slow fuse, so that brief current peaks above the normal load level do not cause any response of the protective system.

Upon the occurrence of a load short circuit, the voltage drop across resistor R1 increases substantially, so that the Zener voltage across Zener diode G is finally exceeded. This voltage is effective at the base of transistor H3, so that the latter is triggered conductive and effects switching of bistable switch means BS. Since this circuit is very low-ohmic, condenser C1 effects practically no delay. The response limit can be determined by selecting the Zener voltage of Zener diode G, or by adjusting the resistance value of resistor R1.

If the rectifier supplying the input terminals E1 and E2 is a three-phase rectifier, usually no filter means is provided at the output of the rectifier. If one phase is eliminated, or inoperative, a hum voltage is developed, and this cannot be sufficiently compensated by regulation. This hum voltage is applied across condenser C2 to the input of bistable switch means BS. As soon as the amplitudes of the hum or ripple voltage exceed the response voltage of bistable switch means BS, this switch means switches to the conductive state to render load transistor HS ineffective or blocked.

Figure 2:
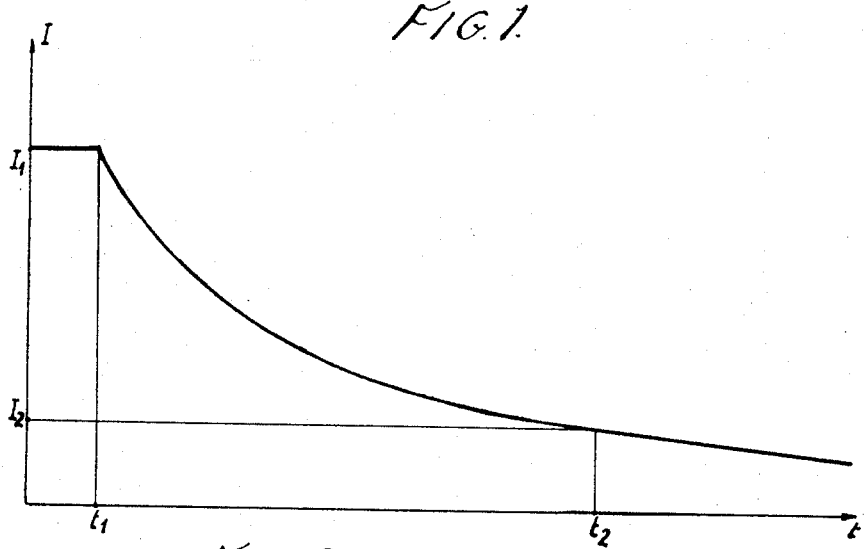
FIG. 2 is a graphic illustration of the release or current interruption characteristic of the power supply shown in FIG. 1.

FIG. 2 graphically illustrates the triggering or release characteristic of bistable switch means BS. The response time $t$ is plotted as the abscissa, and the current I, flowing in line L1, is plotted as the ordinate. It is known that, with a current $I_2$ corresponding approximately to 1.5 times the rated current, a certain response time is provided by appropriate selection of the time constants of the condenser C1 and resistor R1 combination. If current I increases, response time $t$ decreases until it reaches a value $T_1$ when the short circuit current is $I_1$. With this current $I_1$, Zener diode G, and thus also transistor H3, become conductive. The circuit thus responds immediately and transistor HS is blocked. When the trouble is eliminated, the bistable switch means must be disconnected, and this can be done, for exampule, by interrupting the D.C. voltage supply by operating switch D.

It will be clear that components of the embodiment of the invention shown in FIG. 1 may be modified. Thus, for example, transistor H3 could be replaced by a semiconductor diode but, in this case, the increased action of a transistor would have to be foregone. Also, the protective short circuit including Zener diode G can be omitted for certain special cases, such as, for example, with regulated D.C. voltage power supplies having small outputs. Additionally, bistable switch means BS need not take the particular form illustrated in FIG. 1.

While a specific embodiment of the invention has been shown and described in detail to illustrate the application of the principles of the invention, it should be understood that the invention may be embodied otherwise without departing from such principles.

What is claimed is:
1. A regulated D.C. voltage power supply comprising, in combination, a pair of input terminals for connection to a source of unidirectional potential; a pair of load terminals; a positive conductor connecting one input terminal to one output terminal; at least one control transistor having its collector-emitter circuit connected in series in said positive conductor between said one input terminal and said one load terminal; a negative conductor connecting the other load terminal to the other input terminal; a control amplifier connected to said output terminals and to the base of said control transistor and varying the base current thereof with variations in the voltage across said output terminals; a resistor connected between said control transistor and said one load terminal; a bistable switch means connected in parallel with the base-emitter circuit of said control transistor, and to said resistor, and having a control input; said bistable switch means being normally non-conductive; first circuit means connecting said control input to said resistor and effective, upon an increase in the voltage drop across said resistor due to an increase in the current flow in said positive conductor, to trigger said bistable switch means conductive to shunt the base-emitter circuit of said control transistor to trigger the latter to the blocking state; second circuit means connected to said control input and operable, responsive to an increase in the voltage across said resistor above a predetermined value to trigger said bistable switch means conductive to shunt the base-emitter circuit of said control transistor to trigger the latter to the blocking state; and pulsating unidirectional voltage responsive means connected to said control input and to one of said input terminals and operable, responsive to the peak amplitude of a pulsating unidirectional potential, to trigger said bistable switch means to the conductive state to shunt the base-emitter circuit of said control transistor to trigger the latter to the blocking state.

2. A regulated D.C. voltage power supply, as claimed in claim 1, in which said first and second circuits are voltage integrating circuits.

3. A regulated D.C. voltage power supply, as claimed in claim 1, in which said first circuit is a voltage integrating circuit connecting said control input to the load terminal end of said resistor; said second circuit including a Zener diode and a semi-conductor valve element connected to said resistor for integrating the voltage across the latter; said pulsating unidirectional voltage responsive means comprising a condenser connecting said control input to said negative conductor.

4. A regulated D.C. voltage power supply, as claimed in claim 1, in which said bistable switch means comprises two complementary transistors arranged in mutual feedback relation, the emitter of one transistor being connected to said positive conductor and the emitter of the other transistor being connected to the base of said control transistor.

5. A regulated D.C. voltage power supply, as claimed in claim 3, in which said bistable switch means comprises first and second complementary transistors, the collector of each of said first and second transistors being connected to the base of the other of said first and second transistors; the emitter of said first transistor being connected to said positive conductor and the emitter of said second transistor being connected to the base of said control transistor; whereby the control is effected on the base of said control transistor; the emitter of said control transistor being connected with said positive conductor in a direction toward said one load terminal.

6. A regulated D.C. voltage power supply, as claimed in claim 3, in which said resistor is a potentiometer having an adjustable tap.

7. A regulated D.C. voltage power supply, as claimed in claim 3, in which said voltage integrating circuit comprises a condenser connected between said control input and said positive conductor, and a resistor connected between said control input and the emitter output circuit of said control transistor.

8. A regulated D.C. voltage power supply, as claimed in claim 7, in which said first mentioned resistor is a potentiometer having an adjustable tap.

9. A regulated D.C. voltage power supply, as claimed in claim 8, in which said second mentioned resistor is connected to said adjustable tap.

10. A regulated D.C. voltage power supply, as claimed in claim 3, in which said semi-conductor valve element is a further transistor; a second resistor connecting the emitter of said further transistor to the emitter of said control transistor; the collector of said further transistor being connected to said control input; a third resistor connecting the base of said further transistor to a base current feed line connected to the base of said control transistor; said Zener diode being connected between the base of said further transistor and the load terminal end of said first mentioned resistor.

References Cited

UNITED STATES PATENTS

| | | |
|---|---|---|
| 3,068,392 | 12/1962 | Santelmann. |
| 3,284,692 | 11/1966 | Gautherin. |
| 3,356,930 | 12/1967 | Lupoli et al. _____ 323—20 |
| 3,366,871 | 1/1968 | Connor _____ 317—31 X |

LEE T. HIX, *Primary Examiner.*

A. D. PELLINEN, *Assistant Examiner.*

U.S. Cl. X.R.

323—9, 38; 317—33